Oct. 4, 1932.　　　J. W. LEIGHTON　　　1,881,233
END CONNECTION FOR VEHICLE SPRINGS AND METHOD OF MAKING SAME
Filed May 2, 1932
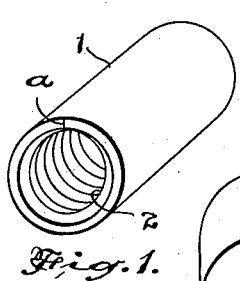
Fig.1.
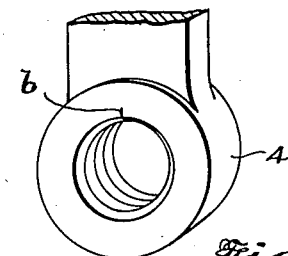
Fig.2.
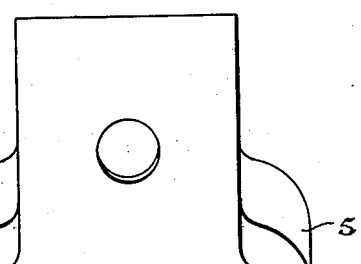
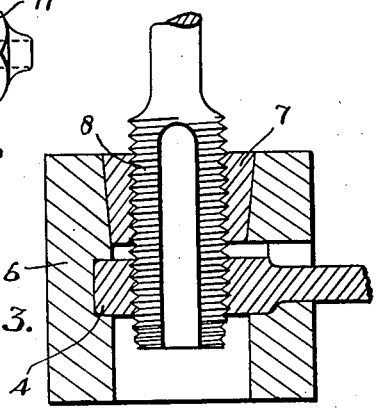
Fig.3.
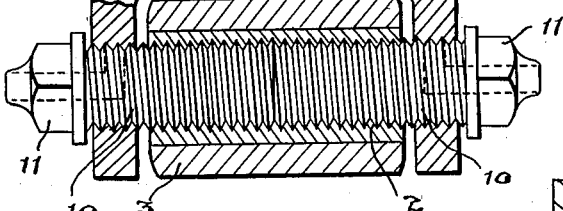
Fig.6.
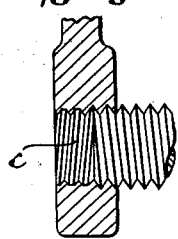
Fig.7.
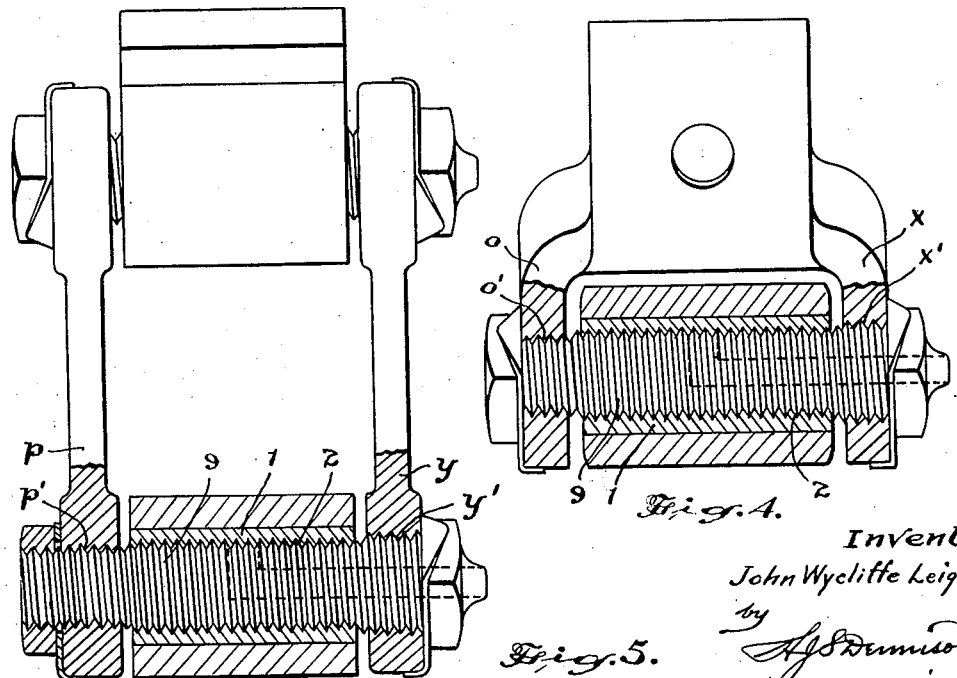
Fig.5.　　Fig.4.
Inventor:
John Wycliffe Leighton.
by
A. J. S. Dennison
atty.

Patented Oct. 4, 1932

1,881,233

UNITED STATES PATENT OFFICE

JOHN WYCLIFFE LEIGHTON, OF PORT HURON, MICHIGAN

END CONNECTION FOR VEHICLE SPRINGS AND METHOD OF MAKING SAME

Application filed May 2, 1932. Serial No. 608,635.

The principal objects of this invention are to provide a spring bearing support of the threaded type which may be adapted for use on either the shackle end or bracket end of a spring and which will be easily and accurately assembled and will ensure the spring end or bracket block being located and maintained in a uniformly spaced relation with the shackle bars or bracket lugs, thereby ensuring proper alignment.

A further important object is to provide a method of tapping the bracket lugs or shackle bars and the central supporting member in their proper spaced relation to provide a continuity of thread arrangement which will enable the insertion of the threaded supporting member without requiring any adjustment to align the threads of the several members.

The principal features of the invention consist in the novel arrangement of the thread spirals in the shackle bars or bracket arms and the central supporting member, whereby the spiral of the thread in the central member when spaced between the shackle bars or bracket arms is in continuous spiral sequence with the threads of said shackles or bracket arms permitting the insertion of the threaded shackle bolt without adjusting the position of the central member to align the threads.

A further and important feature consists in the novel construction of the threads whereby the shackle bolt is formed with a centrally arranged threaded portion of a different diameter than one or both of its ends and the threads of the shackles or bracket lugs at the opposite ends of the centre support are of diameters that will tighten on the corresponding portions of the bolt.

A still further feature of importance consists in the novel manner of threading the shackles or bracket and centre support member so that when assembled with the required spacing, the threaded bolt can be screwed into place without material alteration of the spacing which might result in detrimentally affecting the alignment of the spring, or where shackles are used, both upper and lower bolts will enter the threads of both shackles and centre support without adjustment of position.

In the accompanying drawing, Figure 1 is a perspective view of an internally threaded bushing specially marked to indicate the commencement of the thread.

Figure 2 is a perspective view of a shackle end specially marked to indicate the commencement of the thread.

Figure 3 is a sectional elevational view of a jig and tap for tapping shackle ends or bracket lugs with the thread commencing always at the same relative point.

Figures 4 and 5 are part sectional part elevational views of bracket and shackle supports for spring ends showing the bolts rigidly secured in the shackles or bracket and having a turning fit in the bushings.

Figure 6 is a sectional part elevational detail showing an arrangement of threaded bolts having a rotating thread bearing in the bracket arms.

Figure 7 is a sectional detail of a shackle end and bolt showing a thread construction for effecting the secure locking of the bolt.

It has been amply demonstrated in recent automobile construction that the threaded type of bearing support for springs is extremely desirable, but numerous forms of construction have been found to be complicated both in their structure and method of manufacturing and assembling. A number of the objections have been removed in the present structure and method of manufacture.

According to the present method of manufacture the bushing 1, with which it is preferred to furnish the spring eye, is threaded with a thread 2 to correspond with the thread of the shackle bolt and may be a tight or "journal" fit as may be desired. The bushing 1 is marked at the end with a mark "a" at the commencement point of the thread and the bushing so marked is inserted into the spring eye 3 or into a frame bracket block with a mark "a" in a predetermined relation thereto.

The shackles 4 or bracket arms 5 are tapped in such a manner that the commencement of the thread marked with a mark "b" is arranged in a predetermined position relative thereto, the tapping being accomplished preferably by the use of a suitable jig 6 into which the shackle or bracket arm is inserted. The jig is provided with a lead screw 7 the thread of which is in a fixed and predetermined relation to the shackle or bracket arm to be inserted and a tap 8 is rotatably mounted in the lead screw and when operated enters the pierced shackle or bracket arm at the predetermined point "b".

In assembling the parts thus prepared the bushing is inserted into the spring eye or frame block with the mark "a" in a definitely located position. The shackles or end frame brackets are then placed in position with their threaded holes in alignment with the threaded hole of the bushing and are spaced from the bushing in their pre-determined location for assembly.

The shackle bolt or bolts are then inserted through the shackle or bracket arm and on being inserted, when the end of the bolt passes through the shackle or bracket arm and spans the gap between such shackle or bracket and the spring eye or frame block, the thread of the bolt enters the thread of the bushing without displacing the positioning of the shackle or spring arm, and likewise when the bolt projects through the bushing at its opposite end it will span the gap between the bushing and shackle or bracket arm and enter the thread of the opposite shackle or bracket arm without displacing the position of either member.

In the forms of the invention illustrated in Figures 4 and 5, the bracket arm $x$ and shackle $y$ are provided with threaded orifices $x'$ and $y'$, the pitch diameter of which is greater than the pitch diameter of the thread 2 of the bushing 1 and the bracket arm $o$ and shackle $p$ are formed with threaded orifices $o'$ and $p'$ which are here shown of a lesser pitch diameter than the thread 2 of the bushing 1, but the thread of both bracket arms and both shackles are of the same pitch as the thread of the bushing.

The shackle bolt 9 is formed with threads corresponding in pitch diameter to those cut in the bracket or shackle arms and the bushing, that is to say, the thread of the bolt has a pitch diameter at its point corresponding to the bracket arm $o$ and shackle $p$ and at its base next to the head a thread corresponding to that cut in the bracket arm $x$ or shackle $y$. These end threads are preferably cut to form a tight fit while the intervening and intermediately sized thread of the bolt which extends through the bushing is a free turning fit therein.

It has been found that the shackle bolt may be locked very securely by cutting the thread in the shackle or bracket arm with the apex of the thread recess flattened as shown at "c" in Figure 7 and when the full diameter thread of the bolt is screwed therein the sharp edge of the hardened bolt thread cuts into and swages the softer metal at the apex of the thread recess and securely binds the bolt against accidental removal.

Such a construction of bolt may be formed in a very simple manner by a rolling or other well-known threading process.

In the application of the invention illustrated in Figure 6, I have shown the thread in both bracket arms to be of substantially the same pitch diameter as the thread in the bushing or frame block and a pair of headed bolts 10 are inserted, one through each of the bracket arms into the bushing. The bolt threads are here shown a tight fit in the bushing or frame block and a rotating fit in the bracket arms and the heads 11 of the bolt are spaced from the bracket arms to permit the bracket arms to rotate freely on the threaded bolts. The bolt threads may, however, be made a tight fit in the bracket arms and a rotating fit in the bushing or block if desired.

It will of course be understood that in accordance with the purport of this invention the threads in the centre support or bushing will be definitely located in respect to the threads of the bracket arms in the same manner as hereinbefore described in respect to the bushing 1 and shackles 4 and bracket arms 5.

The method of construction of a spring end support as herein described is extremely simple, but the result achieved has not been reached without a great deal of thought and experiment and by means of the present invention several very desirable and important results are achieved.

What I claim as my invention is:—

1. A vehicle spring suspension, comprising spaced bracket arms or shackle bars and a support arranged between and spaced from said arms or bars, said arms or bars and said support being threaded with their threaded walls formed in spiral continuity, and a threaded bolt extending between each of said shackle bars or arms and said centre support and holding the centre support in rotative spaced relation between said arms or shackles.

2. A vehicle spring suspension, comprising spaced bracket arms or shackle bars and a support arranged between and spaced from said arms or bars, said arms or bars and said support being threaded with their threaded walls formed in spiral continuity, and a threaded bolt extending between each of said shackle bars or arms and said centre support and holding the centre support in rotative spaced relation between said arms or shackles, the thread of said bracket arms or shackles being a jamming fit for the portion of the bolt thread finally engaging same.

3. A vehicle spring suspension, comprising spaced bracket arms or shackle bars and a member arranged between and spaced from said arms or bars, said arms or bars and said central member being threaded in spiral continuity, the thread in one arm or shackle being of a greater pitch diameter than the thread in the centre member, and a bolt threaded into said arms or shackles and through said centre member and having a portion thereof formed with a thread to fit tightly into the threaded recess of enlarged pitch diameter, the centre thread being a turning fit in the threaded centre member.

4. A vehicle spring suspension, comprising definitely spaced bracket arms or shackle bars having threads arranged in spiral continuity, a centre spring bushing arranged between and definitely spaced from said arms or bars and having a threaded orifice the thread of which is arranged in spiral continuity with the threads of said arms or bars, and a bolt having a thread formed thereon of corresponding pitch to the threads of said arms or shackles and bushing and supporting said bushing in a definitely spaced rotative relation to said arms or shackles.

JOHN WYCLIFFE LEIGHTON.